United States Patent [19]

Rogers

[11] Patent Number: 5,480,214

[45] Date of Patent: Jan. 2, 1996

[54] SIDE DUMP TRAILER

[76] Inventor: Ralph R. Rogers, 733 W. 21st St., South Sioux City, Nebr. 68776

[21] Appl. No.: 326,468

[22] Filed: Oct. 20, 1994

[51] Int. Cl.⁶ ....................................................... B60P 1/16
[52] U.S. Cl. ........................... 298/17.6; 296/184; 298/18; 414/470
[58] Field of Search ........................... 105/409; 296/184; 298/17.6, 18; 414/470

[56] References Cited

U.S. PATENT DOCUMENTS

| 2,072,998 | 3/1937 | Allin | 298/17.6 |
| 4,494,798 | 1/1985 | Bailey | 298/17.6 |

FOREIGN PATENT DOCUMENTS

| 2058661 | 3/1992 | Canada | 296/184 |

Primary Examiner—Michael S. Huppert
Assistant Examiner—Janice L. Krizek
Attorney, Agent, or Firm—Zarley, McKee, Thomte, Voorhees & Sease; Dennis L. Thomte

[57] ABSTRACT

A side dump trailer comprising a trailer body pivotally mounted on a wheeled frame fashioned so as to enable the material within the trailer body to be dumped from either side of the trailer. A pair of spaced-apart saddles are provided at each side of the trailer frame and have rocker pins removably and pivotally received therein. When it is desired to dump the material from the trailer from one side thereof, locks on the rocker pins at the opposite side of the trailer are released and hydraulic cylinders are extended to cause the trailer body to pivot about the rocker pins at the dumping side of the trailer. The body of the trailer is also designed to provide strength and to ensure complete dumping of the contents therein.

5 Claims, 6 Drawing Sheets

SIDE DUMP TRAILER

BACKGROUND OF THE INVENTION

1. Field of the Invention

This invention relates to a side dump trailer and more particularly to a side dump trailer which enables the contents thereof to be dumped from either side of the trailer.

2. Description of the Related Art

Trailers have been used for many years to haul rock, gravel, dirt, rip rap, break out, etc. One type of trailer previously used is one having an end gate at the rearward end thereof so that the contents of the trailer may be dumped from the rear of the trailer as the forward end of the trailer body is elevated by means of a hydraulic cylinder or the like. One problem associated with a rear tail gate is that the materials in the trailer tend to become clogged at the tail gate area. Further, tail gates sometimes do not fully open or fully close.

In an effort to overcome some of the disadvantages associated with rear dumping trailers, side dump trailers have been provided. Although the side dump trailers of the prior art do enable the contents of the trailer to be dumped from the side of the trailer, rather than through an end gate, it is believed that the prior art side dump trailers also present some disadvantages. One disadvantage of the prior art side dump trailers is that they do not dump the materials sufficiently outwardly of the side of the trailer which results in the dumped materials interfering with the movement of the trailer. A further disadvantage of the prior art side dump trailers is that some of the same do not completely dump all of the contents of the trailer. A further disadvantage of the prior art side dump trailers is that some of the same are not safe to use since the trailer bodies do not include sufficient locking mechanisms to maintain the trailer bodies in a non-dumping position.

SUMMARY OF THE INVENTION

A side dump trailer has been provided which includes an elongated wheeled frame having first and second supports positioned thereon adjacent the forward and rearward ends thereof respectively, at one side thereof. Third and fourth supports are also provided on the wheeled frame adjacent the forward and rearward ends thereof respectively, at the other side of the frame. An elongated body is movably positioned on the wheeled frame and has an open upper end for receiving materials to be transported. First and second rocker pins are secured to the body adjacent the forward and rearward ends thereof at one side thereof which are adapted to be removably and/or pivotally received by the first and second supports. Third and fourth rocker pins are secured to the body adjacent the forward and rearward ends thereof at the other side thereof and are adapted to be removably and/or pivotally received by the third and fourth supports respectively. A locking device is associated with each of the rocker pins to selectively prevent the rocker pins from moving out of engagement with the respective support. First and second hydraulic cylinders are secured to the frame at the forward and rearward ends of the body respectively, and are pivotally connected to the upper portions of the ends of the body intermediate the sides thereof. When the hydraulic cylinders are extended, the body will dump the material therein from one side thereof when the locking devices associated with the first and second locking pins are in their locked positions and the third and fourth locking devices are in their unlocked positions. The body will dump the material therein from the other side of the trailer when the third and fourth locking devices are in their locked positions and the first and second locking devices are in their unlocked positions. The body of the trailer is also designed for maximum strength and complete dumping.

It is therefore a principal object of the invention to provide an improved side dump trailer.

A further object of the invention is to provide a side dump trailer which enables the contents of the trailer to be dumped from either side thereof.

Still another object of the invention is to provide a side dump trailer including locking devices for maintaining the trailer body in a non-dumping position.

Still another object of the invention is to provide a side dump trailer which dumps the material therein sufficiently outwardly of the trailer so as to prevent the dumped materials from interfering with the operation of the trailer.

Still another object of the invention is to provide a side dump trailer which enables all of the contents of the trailer to be dumped therefrom.

Still another object of the invention is to provide a side dump trailer which is rugged.

These and other objects of the invention will be apparent to those skilled in the art.

DESCRIPTION OF THE PREFERRED EMBODIMENT

Figure 1:
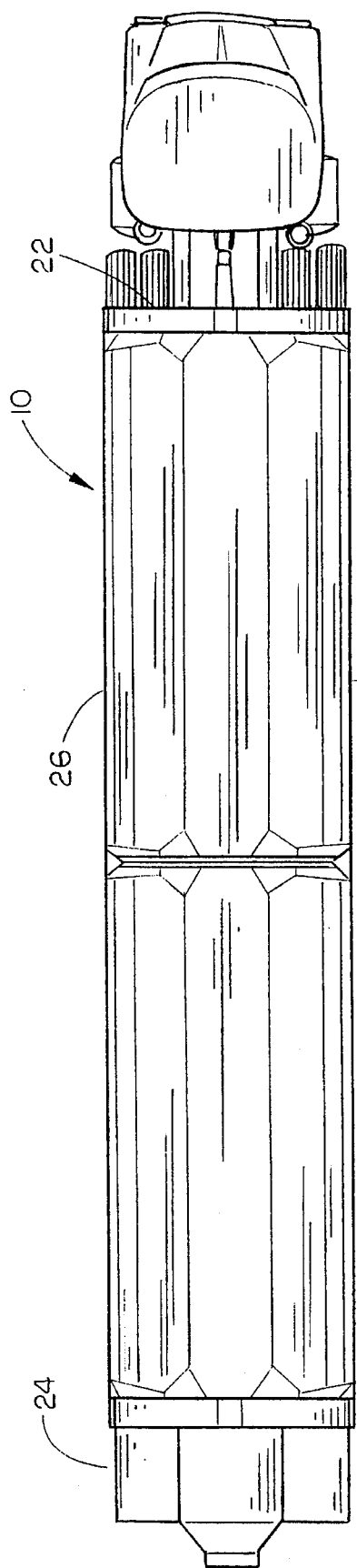
FIG. 1 is a top view of the side dump trailer of this invention.
Figure 2:
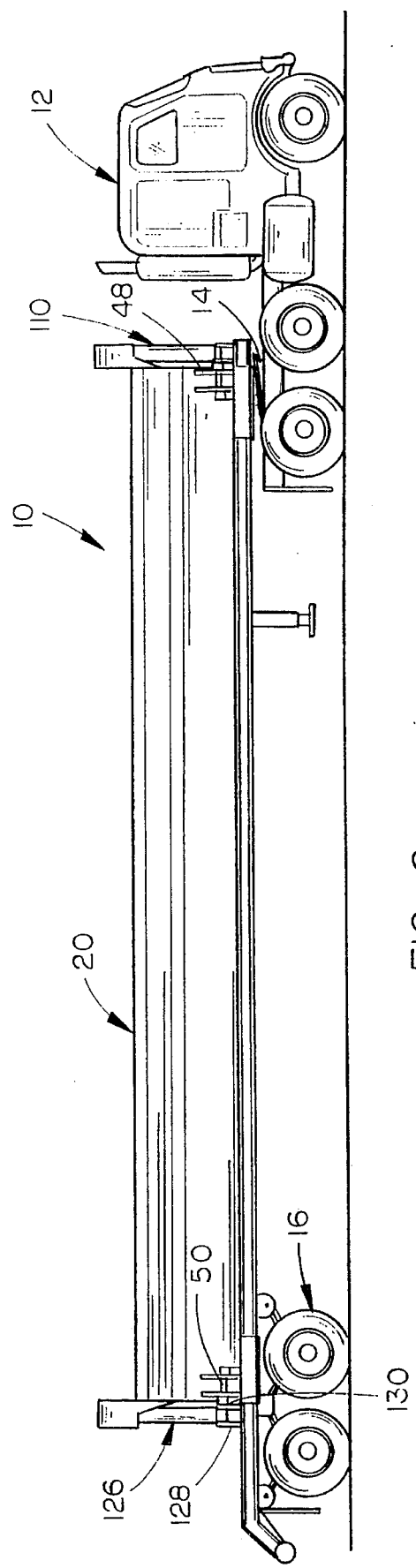
FIG. 2 is a right side view of the side dump trailer of this invention.

The numeral 10 generally refers to the side dump trailer of this invention. Although the drawings illustrate that the side dump trailer 10 is being pulled by a truck 12 having a fifth wheel 14, trailer 10 could be mounted on any suitable truck frame. However, it is preferred that the trailer 10 be pulled by a truck 12 through the fifth wheel 14. Trailer 10 includes a wheeled frame 16 having a king pin 18 provided at the forward end thereof for connection to the fifth wheel 14. Body 20 is mounted on the wheeled frame 16 as will be described in more detail hereinafter. For purposes of description, the body 20 will be described as including a forward end 22, rearward end 24, opposite sides 26 and 28 and an open upper end 30.

Figure 6:
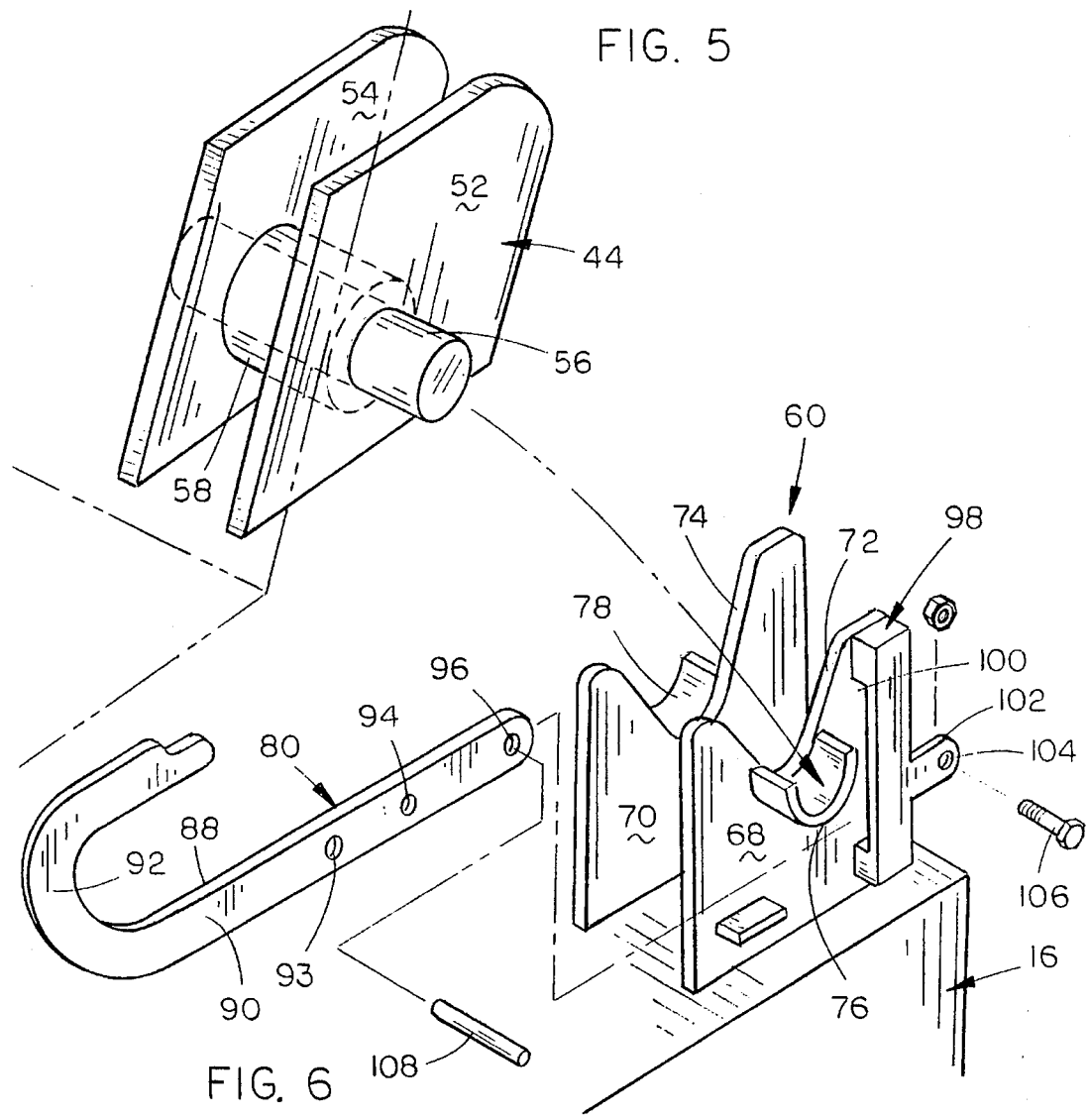
FIG. 6 is an exploded perspective view of the one saddle, rocker pin and locking device.

The forward end of the body 20 is defined by a front bulkhead 32 while the rearward end of the body 20 is defined by a rear bulkhead 34. An intermediate baffle 36 is provided between the bulkheads 32 and 34. In general, body 20 includes a bottom 38 and side walls 40 and 42. The details of the construction of the side walls will be described in more detail hereinafter. A rocker pin assembly 44 is provided at the forward end of the body 20 adjacent side wall 40. Rocker pin assembly 46 is secured to the body 20 at the rearward end thereof adjacent side wall 40. Rocker pin assembly 48 is provided at the forward end of body 20 adjacent side wall 42. Rocker pin assembly 50 is provided at the rearward end of the body 20 adjacent side wall 42. Inasmuch as the rocker pin assemblies 44, 46, 48 and 50 are identical, only rocker pin assembly 44 will be described in detail. Rocker pin assembly 44 includes a pair of plates 52 and 54 which are welded to side wall 40 in a horizontally spaced-apart condition. Rocker pin 56 is secured to the rocker plates 52 and 54 and has its opposite ends extending outwardly of the plates 52 and 54 as illustrated in FIG. 6. Bushing 58 is mounted on rocker pin 56 between plates 52 and 54 as also illustrated in FIG. 6.

Figure 4:
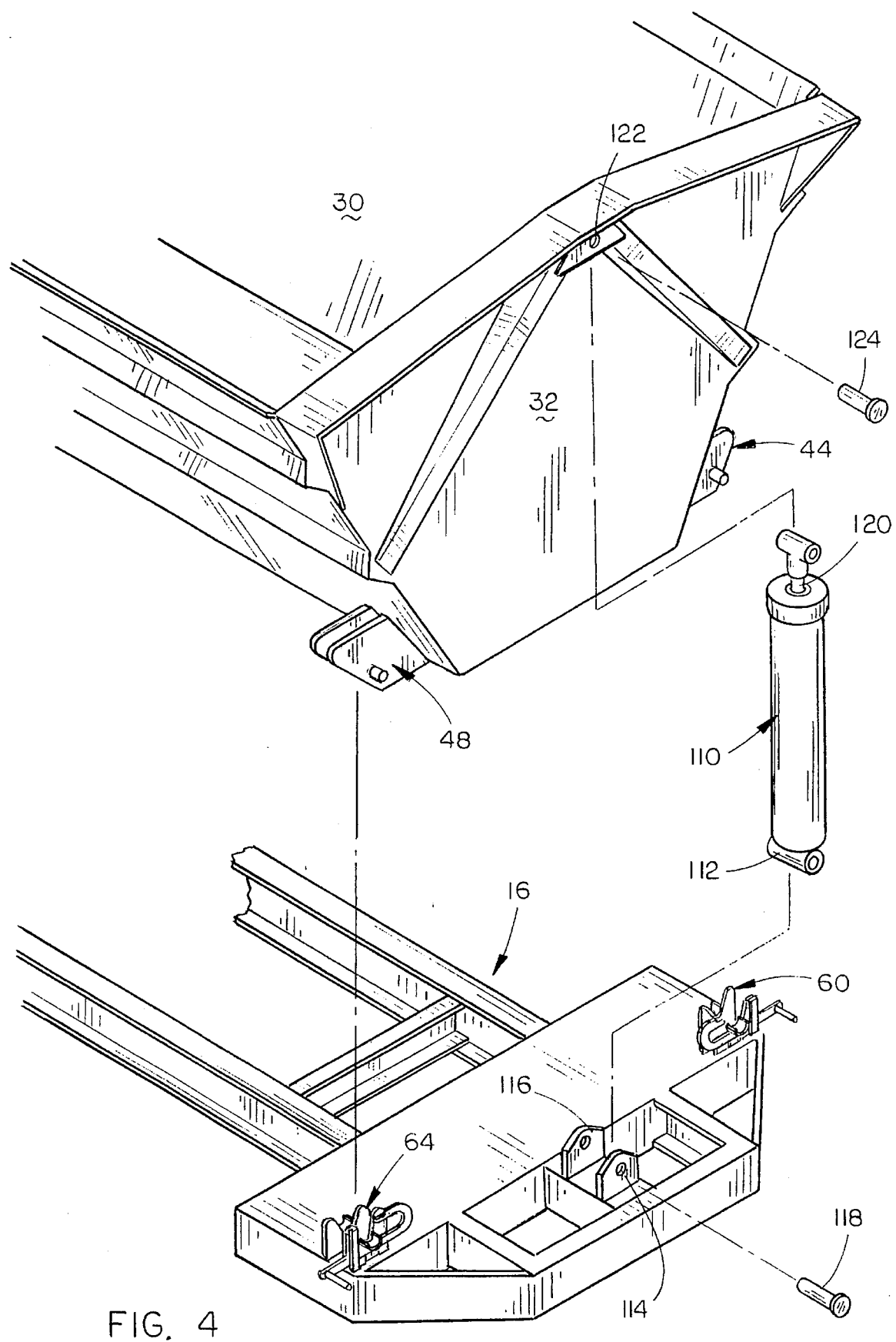
FIG. 4 is a front exploded perspective view of the trailer.

Saddle support 60 is secured to frame 16 below rocker pin assembly 44 as illustrated in FIG. 4. Saddle supports 62 (not shown), 64 and 66 are also secured to the frame 16 below rocker pin assemblies 46, 48 and 50 respectively. Inasmuch as the saddle supports 60, 62, 64 and 66 are identical, only saddle support 60 will be described in detail. Saddle support 60 includes a pair of horizontally spaced saddle plates 68 and 70 which are welded to the frame 16. As seen in FIG. 6, plates 68 and 70 are provided with recesses or cut-out portions 72 and 74 formed in the upper ends thereof respectively. U-shaped members 76 and 78 are welded to the outer surfaces of plates 68 and 70 respectively, at the lower ends of the recesses 72 and 74 as seen in FIG. 6. When rocker pin assembly 44 is positioned on saddle support 60, plates 52 and 54 are received between the plates 68 and 70 with the outer end portions of pivot pin 56 resting in the lower ends of the recesses 72 and 74 and in the U-shaped members 76 and 78 respectively.

A manually operated locking device is associated with each of the saddle supports 60, 62, 64 and 66 and will be referred to as locking devices 80, 82 (not shown), 84 and 86 respectively. Inasmuch as locking devices 80, 82, 84 and 86 are identical, only locking device 80 will be described in detail. Locking device 80 includes a J-shaped slide 88 having an arm portion 90 and a hook portion 92. Arm portion 90 is provided with spaced-apart openings 93, 94 and 96 formed therein for a purpose to be described hereinafter. Bracket 98 is secured to the forward side of plate 68 and includes recess portion 100 which slidably receives the arm portion 90 of locking device 80. Ear 102 extends outwardly from bracket 98 and has an opening 104 formed therein. Locking bolt 106 may be extended through the opening 104 and through one of the openings 93 and 94 of locking device 80 to maintain the locking device in either its locked or unlocked position. An elongated operating handle 108 has one end received in opening 96 of arm portion 90 and is welded to the arm portion 90 to provide a handle for conveniently moving the locking device 80 between its locked and unlocked positions.

The numeral 110 refers to a hydraulic cylinder having a base end 112 pivotally secured to plates 114 and 116, mounted on the forward end of frame 16, by means of pin 118. Plates 114 and 116 are located at the center of the frame 16 at the forward end thereof as best seen in FIG. 4. The rod 120 of hydraulic cylinder 110 is pivotally connected to the upper end of bulkhead 32 at 122 by means of pin 124. A hydraulic cylinder 126 is provided at the rear of the body 20 and has its base end pivotally secured to a pair of plates 128 and 130, mounted on the rearward end of frame 16, and its upper end pivotally secured to the upper end of rear bulkhead 34 at the center thereof by means of a conventional pin similar to pin 124. Hydraulic cylinders 110 and 126 are fluidly interconnected and are connected to a source of hydraulic fluid under pressure for simultaneous retraction and extension of the rods thereof.

Figure 5:
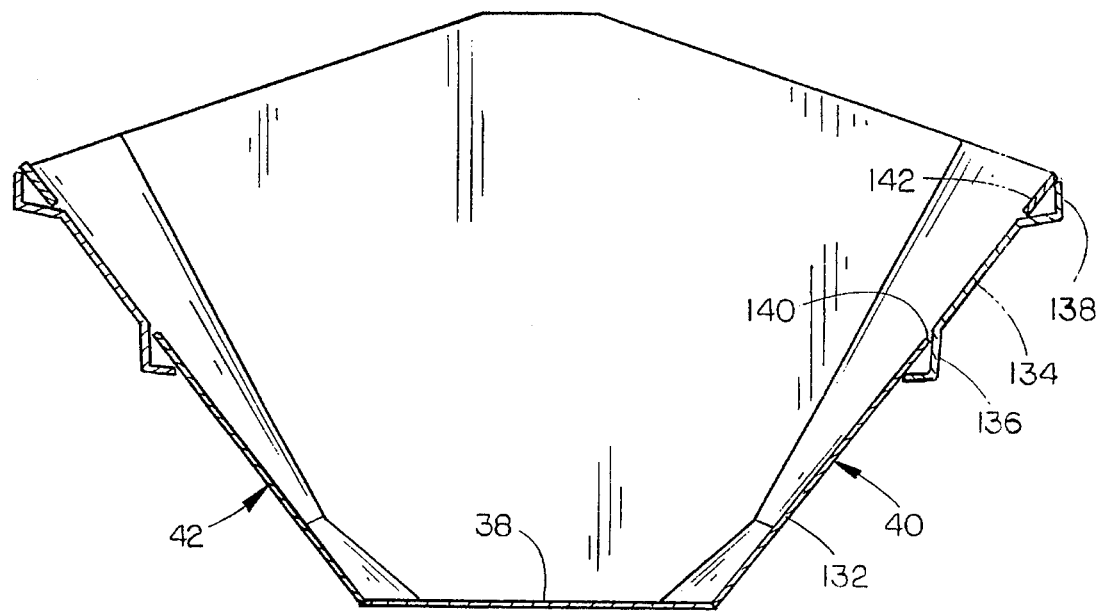
FIG. 5 is a sectional view of the trailer body.
Figure 8:
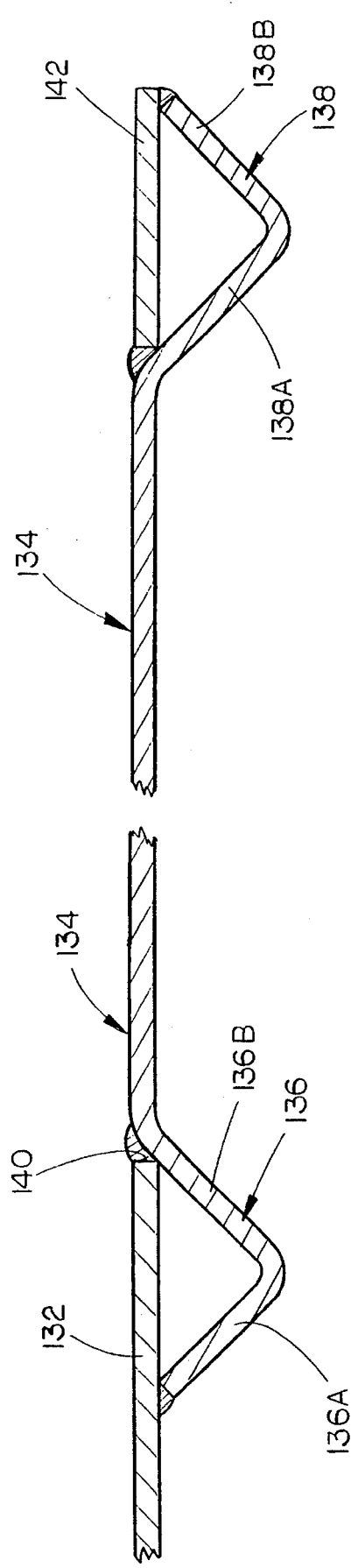
FIG. 8 is a partial sectional view of one of the side walls of the trailer body.

As previously stated, body 20 includes a bottom wall 38 and side walls 40 and 42. Bottom 38 is preferably constructed of single sheets of heavy steel material positioned in an end-to-end relationship. Side walls 40 and 42 are each preferably constructed of a plurality of sheets of heavy steel material as will now be described. Side 40 includes a lower wall member 132 which is flat as best seen in FIG. 4. An upper wall member 134, having V-shaped portions 136 and 138 at its lower and upper edges respectively, is mounted on the upper end of lower wall member 132 in the manner illustrated in FIGS. 5 and 8. For purposes of description, V-shaped portion 136 will be described as comprising members 136A and 136B while V-shaped portion 138 will be described as comprising members 138A and 138B. As seen in FIG. 8, the V-shaped portion 136 of upper wall member 134 is positioned outwardly of the upper end of lower wall member 132 with the upper edge 140 of bottom wall 132 abutting the upper wall member 134 at the upper terminal end of member 136B of V-shaped portion 136, and welded thereto, so that a smooth uninterrupted inner wall surface is provided. The lower end of member 136A is welded to the outer surface of lower wall member 132 as seen in FIG. 8. An elongated flat plate 142 is secured to the inside surface of the V-shaped portion 138 of upper wall member 134 to provide a smooth uninterrupted interior wall surface. As seen in FIG. 8, the lower end of plate 142 abuts the lower inner surface of member 138A and is welded thereto to provide a smooth surface. The upper end of member 138B is welded to the outside surface of plate 142 as also seen in FIG. 8. The V-shaped portions 136 and 138 add strength to the side wall and are believed to be unique. As seen in FIG. 5, side wall 42 is constructed in an identical fashion to side wall 40. Inasmuch as side wall 42 is identical to side wall 40, only side wall 40 will be described in detail.

Figure 7:
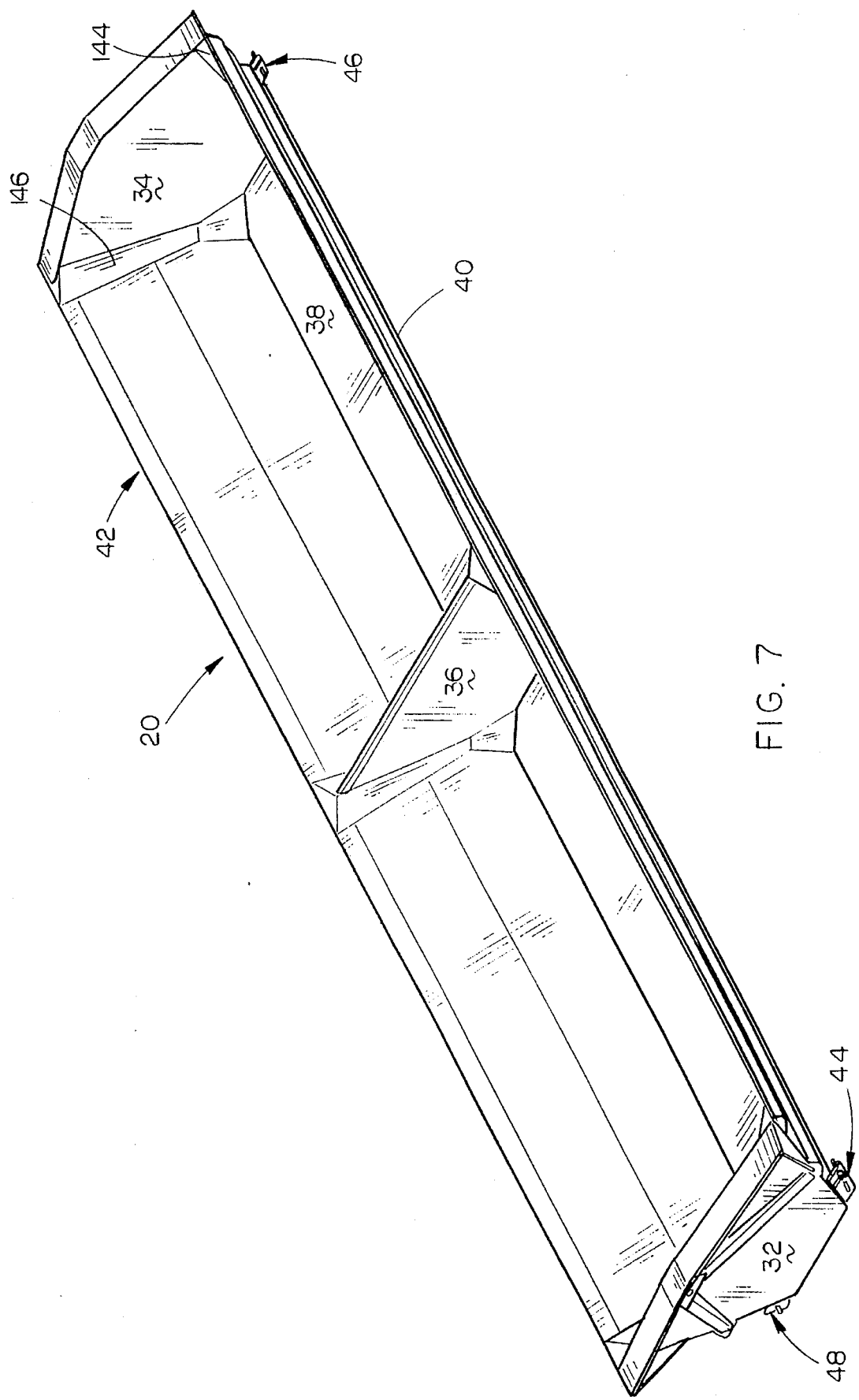
FIG. 7 is a perspective view of the trailer body.

As seen in FIG. 7, gusset plates 144 and 146 are positioned adjacent the juncture of the rear ends of side walls 40 and 42 and the rear bulkhead 34. Gusset plates are also provided at the forward and rearward sides of baffle 36 where the sides of the baffle 36 meet with walls 40 and 42 as best seen in FIG. 7. Gusset plates are also provided at the juncture of the rear surface of front bulkhead 32 and the sides 40 and 42. The purpose of the gusset plates just described is to ensure that material in the body will not become lodged between the junctures of the bulkheads, baffle and the side walls, but will freely dump from the interior of the trailer. Further, the gusset plates add strength to the trailer body design.

When it is desired to haul materials in the trailer, each of the locking devices 80 will be pulled outwardly with respect to its associated saddle supports, by means of the handle 108, so that the hook portion 92 of the locking device 80 is positioned over the exposed outer end of the pin 56. Bolt 106 is then extended through opening 104 in ear 102 and the opening 93 in slide 88 to positively maintain the locking device in its locked condition so that the trailer body will not be inadvertently moved to its dumping position.

Figure 3:
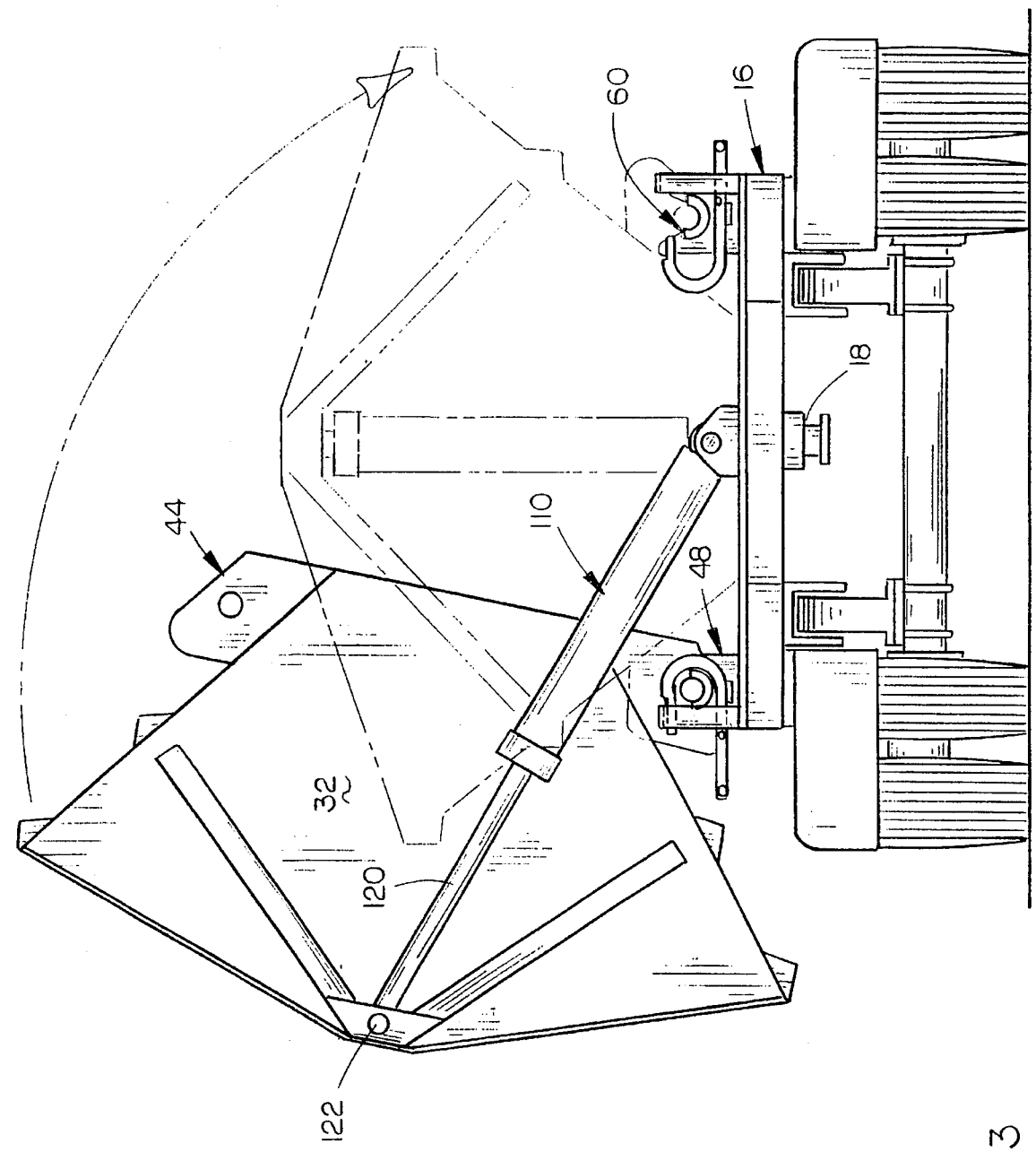
FIG. 3 is a rear view of the side dump trailer of this invention illustrating the trailer body dumping towards the left side of the vehicle with the broken lines illustrating the normal transport position of the trailer body.

When the trailer has arrived at the location where the material is to be dumped, the operator will first determine whether the material is to be dumped from the left side of the trailer or from the right side of the trailer. Assuming that the material is to be dumped from the right side of the vehicle, the locking devices 80 and 82 on the saddle supports 60 and 62 will be moved inwardly from their locked position to their unlocked position, after the bolts 106 have been removed. If desired, the bolts 106 may be inserted through openings 104 and 94 to maintain the locking device 80 in its unlocked position. Hydraulic cylinders 110 and 126 are then simultaneously operated to extend the rods therefrom. As the rods of the hydraulic cylinders 110 and 126 extend from their respective cylinders, upward force is applied to the upper central portion of the front and rear bulkheads. Continued upward movement of the rods of the cylinders 110 and 126 causes the body to pivot about the rocker pins in the rocker pin assemblies 48 and 50 respectively. In other words, the locking pin assemblies 48 and 50 pivotally move with respect to their associated saddle supports 64 and 66. As the cylinders 110 and 126 are extended, the rocker pin assemblies 44 and 46 raise upwardly out of engagement with their associated saddle supports 60 and 62 respectively. The hydraulic cylinders 110 and 126 are extended until the body 20 has been completely moved to its dumping position as illustrated in FIG. 3. After the materials have been dumped from the body 20, the hydraulic cylinders 110 and 126 are retracted to return the body 20 to the transport position as illustrated by broken lines in FIG. 3. At that time, the locking devices 80 and 82 are returned to their locked position by sliding the slides 88 outwardly with the bolts 106 then being reinstalled in the openings 104 and 93.

If it is desired to dump the materials from the left side of the body 20, locking devices 84 and 86 would be unlocked and locking devices 80 and 82 locked so that the body 20 would pivot with respect to the saddle supports 60 and 62.

The location of the pivot pin assemblies is very important in that the lateral positioning thereof with respect to the center line of the body enables the material in the body to be dumped some distance from the side of the trailer so that the dumped material will not interfere with the operation of the trailer. If the body 20 was pivotally secured to the frame 16 at the lower central portion of the body, the material would dump very close to the body which would interfere with the operation of the trailer.

The trailer may be used to dump the material from either side of the trailer in piles or may be used to spread the material along a roadway, dike, etc. The design of the trailer body insures that the trailer body will be durable and will be completely dumping. The locking devices ensure that the trailer will be safe to operate. Thus it can be seen that the invention accomplishes at least all of its stated objectives.

I claim:

1. A side dump trailer, comprising:

an elongated wheeled frame having a forward end, a rearward end, and opposite sides;

a first support on said wheeled frame adjacent the forward end thereof at one side thereof;

a second support on said wheeled frame adjacent the rearward end thereof at one side thereof;

a third support on said wheeled frame adjacent the forward end thereof at the other side thereof;

a fourth support on said wheeled frame adjacent the rearward end thereof at the other side thereof;

an elongated body movably positioned on said wheeled frame and having a forward end, a rearward end, opposite sides, and an open upper end for receiving materials to be transported;

said body including a substantially flat, horizontally disposed bottom wall having a forward end, a rearward end, and first and second opposite side edges;

said body also including an upstanding forward wall member, an upstanding rearward wall, and first and second side walls which extend upwardly and outwardly from the first and second side edges of said bottom wall;

a first, horizontally disposed pivot pin secured to said first side wall of said body adjacent the forward end thereof adapted to be removably and pivotally received by said first support;

a second, horizontally disposed pivot pin secured to said first side wall of said body adjacent the rearward end thereof adapted to be removably and pivotally received by said second support;

a third, horizontally disposed pivot pin secured to said second side wall of said body adjacent the forward end thereof adapted to be removably and pivotally received by said third support;

a fourth, horizontally disposed pivot pin secured to said second side wall of said body adjacent the rearward end thereof adapted to be removably and pivotally received by said fourth support;

said first, second, third and fourth pivot pins being elongated and having their axes disposed parallel to the length of said body and said wheeled frame;

said first, second, third and fourth pivot pins being positioned on the respective side walls above said bottom wall and outwardly of said side walls;

first, second, third and fourth locking devices selectively movable between locked and unlocked positions for selectively maintaining said first, second, third and fourth pivot pins in said first, second, third and fourth supports respectively when in their locked positions;

a first power cylinder having a base end pivotally secured to said wheeled frame intermediate the sides thereof forwardly of said body and a rod end pivotally secured to said forward wall member of said body intermediate the sides thereof;

a second power cylinder having a base end pivotally secured to said wheeled frame intermediate the sides thereof rearwardly of said body and a rod end pivotally secured to said rearward wall of said body intermediate the sides thereof;

and means for simultaneously selectively extending the rods of said first and second power cylinders whereby said body will dump the material therein from said one side of said body when said first and second locking devices are in their locked positions and said third and fourth locking devices are in their unlocked positions and whereby said body will dump the material therein from said other side of said body when said third and fourth locking devices are in their locked positions and said first and second locking devices are in their said unlocked positions;

the angular relationship of said side walls with respect to said bottom wall, together with the relationship of said pivot pins with respect to said side walls and said bottom wall, enabling the material in said body to be dumped therefrom, when positioned in its dumping positions, without the necessity of pivotally moving said body greater than 90° from its non-dumping position.

2. The side dump trailer of claim 1 wherein each of said locking devices includes a slide which is selectively movable into engagement with its associated pivot pin to prevent the upward movement of the pivot pin relative to the associated support while permitting pivotal movement of the pivot pin with respect to the support, each of said slides including means for locking said slide in its locked position.

3. The side dump trailer of claim 2 wherein each of said first, second, third and fourth supports comprises a pair of horizontally spaced-apart and vertically disposed plates having a recess formed in the upper end thereof for removably receiving and pivotally supporting the associated pivot pin therein.

4. The side dump trailer of claim 1 wherein said first and second side walls are respectively secured to the first and second side edges of said bottom wall; each of said side walls having a rearward end, a forward end, a lower end, an upper end and inner and outer surfaces; said forward wall member secured to the forward ends of said side walls and said bottom wall; said rearward wall secured to the rearward ends of said side walls and said bottom wall; each of said side walls including at least one lower wall member and at least one upper wall member; said lower wall member including a lower end which is secured to said first side edge of said bottom wall and an upper end; said upper wall member including a central portion having V-shaped portions at its upper and lower ends; the V-shaped portion at the lower end of said upper wall member being positioned at the upper end of said lower wall member and being welded to the outer surface; and a plate secured to said upper wall member to enclose the inner surface of the V-shaped portion at the upper end of said upper wall member; said lower wall member, said central portion of said upper wall member and said plate enclosing said V-shaped portion presenting a smooth, uninterrupted inner wall surface.

5. The side dump trailer of claim 1 wherein the base ends of said first and second power cylinders are pivotally secured to said wheeled frame midway between the sides thereof and wherein the rods of said power cylinders are pivotally secured to said body midway between the sides thereof.

* * * * *